(12) United States Patent
Kaku et al.

(10) Patent No.: US 7,900,743 B2
(45) Date of Patent: Mar. 8, 2011

(54) ELECTRIC POWER STEERING SYSTEM FOR VEHICLE AND UTILITY VEHICLE THEREWITH

(75) Inventors: Hidetoshi Kaku, Lincoln, NE (US); Kazumasa Hisada, Lincoln, NE (US); Tyler Furman, Raymond, NE (US); Keaton Friesen, Henderson, NE (US)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 497 days.

(21) Appl. No.: 11/812,894

(22) Filed: Jun. 22, 2007

(65) Prior Publication Data
US 2008/0314678 A1 Dec. 25, 2008

(51) Int. Cl.
*B62D 5/04* (2006.01)
(52) U.S. Cl. ......................................................... 180/444
(58) Field of Classification Search .................. 180/443, 180/444, 417, 422, 426
See application file for complete search history.

(56) References Cited

U.S. PATENT DOCUMENTS

| | | | | |
|---|---|---|---|---|
| 5,423,391 A | * | 6/1995 | Shimizu | 180/446 |
| 6,988,027 B2 | | 1/2006 | Yuda et al. | |
| 7,581,618 B2 | * | 9/2009 | Inaguma et al. | 180/444 |
| 2004/0163879 A1 | * | 8/2004 | Segawa | 180/444 |
| 2006/0086559 A1 | * | 4/2006 | Segawa et al. | 180/444 |
| 2006/0191737 A1 | * | 8/2006 | Kobayashi | 180/444 |
| 2006/0278030 A1 | * | 12/2006 | Tavel et al. | 74/492 |
| 2007/0074928 A1 | * | 4/2007 | Okada et al. | 180/444 |
| 2007/0107977 A1 | * | 5/2007 | Shibata | 180/444 |
| 2008/0211217 A1 | * | 9/2008 | Sanville | 280/775 |

* cited by examiner

*Primary Examiner* — Tony H. Winner
(74) *Attorney, Agent, or Firm* — Wenderoth, Lind & Ponack, L.L.P.

(57) ABSTRACT

An electric power assist device can be compactly disposed with ease in an electric power steering system for a vehicle. The electric power steering system for a vehicle includes: a steering wheel; a steering column incorporating therein a steering shaft connected to the steering wheel and extending downward to the front; and an electric power assist device for assisting a steering torque of the steering wheel. Here, an input shaft and an output shaft of the electric power assist device are connected to the lower end of the steering shaft and the input shaft of the steering gear device, respectively, via universal joints.

5 Claims, 6 Drawing Sheets

ELECTRIC POWER STEERING SYSTEM FOR VEHICLE AND UTILITY VEHICLE THEREWITH

BACKGROUND OF THE INVENTION

I. Technical Field of the Invention

The present invention relates to an electric power steering system for a vehicle and a four wheeled multi use light traveling vehicle provided with the same and, more particularly, to an electric power steering system for a vehicle provided with an electric power assist device including an electric motor.

II. Description of Related Art

Typical examples of a power assist device of a power steering system for a vehicle include a hydraulic power assist device having a hydraulic pump and an electric power assist device having an electric motor.

At present, the hydraulic power assist device has prevailed, with the advantages of great power performance and freedom of arrangement of hydraulic equipment, such as a hydraulic pump at a desired position by use of a hydraulic hose. However, since periodic inspection of the device for an oil leakage or the like is required, maintenance on the device takes significant effort, and further, the continuous driving of the hydraulic pump increases engine power loss.

In contrast, the electric power assist device is compactly constituted of a small number of component parts in comparison with the hydraulic power assist device, and further, is advantageous due to small engine power loss and saved fuel consumption. Unlike the continuously driven hydraulic pump or the like, the electric power assist device has weak power performance in comparison with the hydraulic power assist device. However, a recent improvement in the performance of the electric motor enhances the power performance, thus growing a demand of the electric power assist device.

The electric power steering system for a vehicle provided with the above-described electric power assist device, more particularly, the electric power steering system for the vehicle having a rack and pinion type steering gear device is classified into mainly three types according to the fixing position of the electric power assist device, as follows.

A first type is a column assist type, in which an electric power assist device is fixed to a steering column; a second type is a rack assist type, in which an electric power assist device is fixed to a rack in a rack and pinion type steering gear device; and a third type is a pinion assist type, in which an electric power assist device is fixed to a pinion gear in a rack and pinion type steering gear device.

FIG. 7 is a view showing an electric power steering system for the vehicle of the pinion assist type disclosed in U.S. Pat. No. 6,988,027. The electric power steering system for a vehicle of the pinion assist type includes a steering wheel 100, a steering column 102 incorporating a steering shaft 101 therein, a steering torque transmitting shaft 112, and a rack and pinion type steering gear device 103. An electric power assist device 110 having an electric motor 111 and the like is fixed to the rack and pinion type steering gear device 103 so as to be connected directly to a pinion gear of the rack and pinion type steering gear device 103.

In the case where the electric power assist device is disposed in an existing steering system for a vehicle having no power assist device, the electric power assist device needs to be disposed in a steering power train from the steering column 102 to the steering gear device 103, as shown in FIG. 7. Here, the electric power assist device requires a large space for the electric motor 111, unlike the hydraulic power assist device.

Therefore, it is frequently difficult to secure a space for installing the electric power assist device. Particularly, the space around the steering column and the steering gear device is frequently restricted, thereby making it difficult to dispose the electric power assist device.

SUMMARY OF THE INVENTION

An object of the present invention is to provide an electric power steering system for a vehicle, in which an electric power assist device can be readily disposed in an existing steering system by effectively utilizing a space in a steering power train from a steering column to a steering gear device.

In order to achieve the above-described object, the present invention provides an electric power steering system for a vehicle comprising: a steering wheel being turnably operated by an operator; a steering column for incorporating rotatably therein a steering shaft connected to the steering wheel, the steering column extending downward to the front; an electric power assist device for assisting a steering torque of the steering wheel; and a steering gear device for changing the steering torque to a lateral force to steer front wheels of the vehicle; wherein an input shaft and an output shaft of the electric power assist device are connected to a lower end of the steering shaft and an input shaft of the steering gear device, respectively, via universal joints.

With this configuration, the electric power assist device can be readily disposed by effectively utilizing a space defined between the steering column and the steering gear device. In other words, an existing steering system having no power assist device can be readily improved to a compact electric power steering system.

Preferably, two or more universal joints may be disposed between the input shaft of the electric power assist device and the steering shaft.

With this configuration, misalignment between the steering shaft and the input shaft of the electric power assist device can be absorbed by the two or more universal joints even if there is some fixing error in fixing the electric power assist device, thus preventing any occurrence of a large bending effect or distortion at the input shaft of the electric power assist device during steering. That is to say, it is possible to reduce transmission loss of the steering torque.

Preferably, a torque sensor for measuring steering torque of the steering wheel may be disposed at the input shaft of the electric power assist device.

With this configuration, the steering torque is measured on a steering power train of the electric power assist device immediately before the steering torque is increased by a power assist effect, thus achieving an optimum power assist according to the steering torque. In particular, the steering torque can be measured without any application of a large bending effect or the like in combination with the configuration in which the two or more universal joints are disposed between the input shaft of the electric power assist device and the steering shaft, thus further enhancing the measurement accuracy of the steering torque.

Preferably, the electric power assist device may be fixed to a fixing bracket disposed in a vehicle frame via an elastic tightening device.

With this configuration, in the case where the electric power assist device is disposed between the steering shaft and the steering gear device, a fixing error can be absorbed by an elastic effect of the elastic tightening device together with the universal joint even with the fixing error, thus preventing any misalignment of the shaft of the electric power assist device.

In the present invention, the steering gear device may be a rack and pinion steering gear device.

Moreover, in the present invention, a plurality of universal joints may be disposed between the steering gear device and the electric power assist device.

Additionally, the present invention encompasses a four wheeled utility vehicle provided with an electric power steering system for a vehicle having the above-described features.

The above and further objects and features of the invention will more fully be apparent from the following detailed description with accompanying drawings.

DETAILED DESCRIPTION OF THE INVENTION

Preferred Embodiment

FIGS. 1 to 6 show an electric power steering system for a vehicle and a four wheeled utility vehicle provided with the same in one preferred embodiment according to the present invention. The present invention will be described below in reference to FIGS. 1 to 6.

(Configuration of Entire Vehicle)

Figure 1:
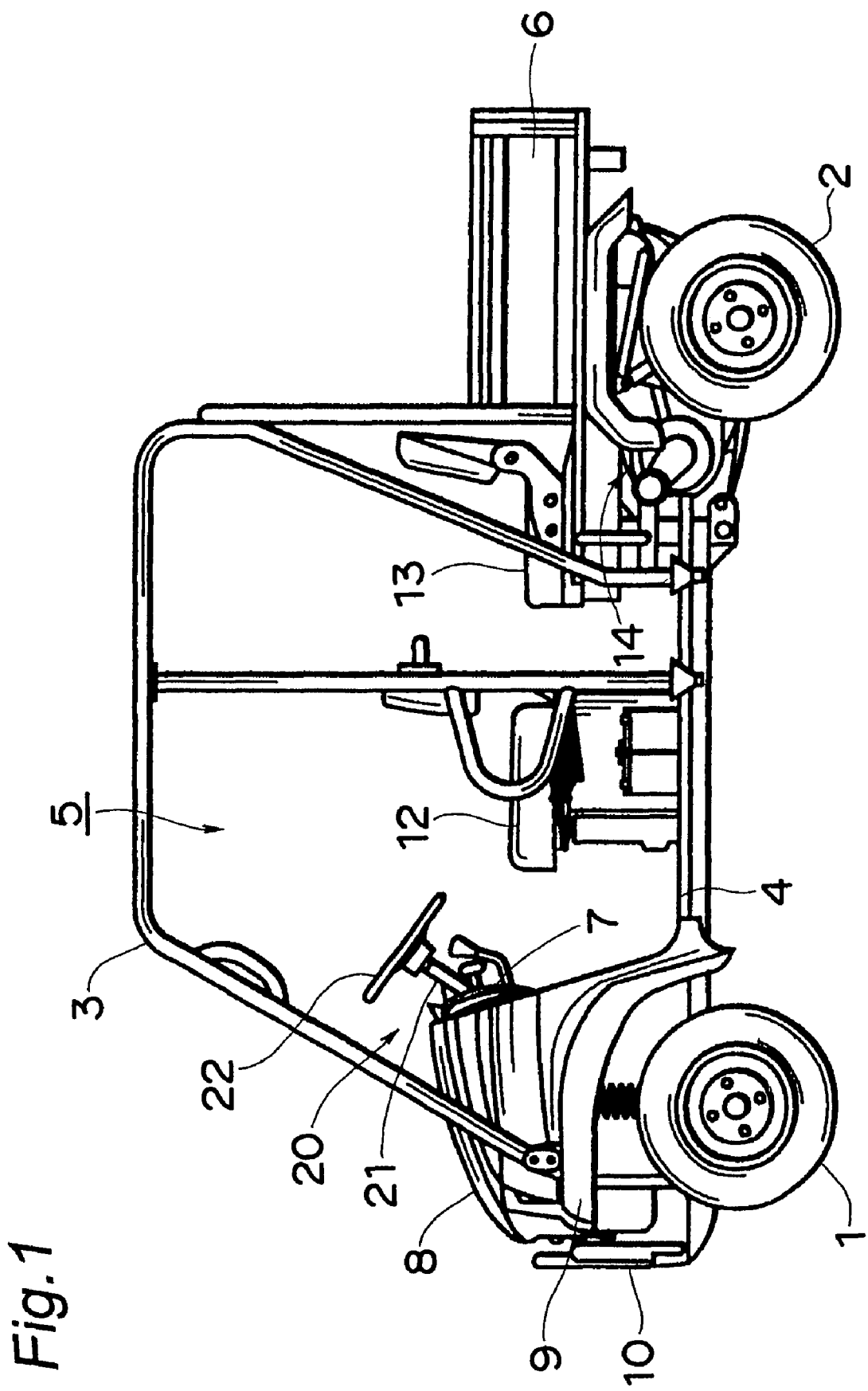
FIG. 1 is a left side view showing a four wheeled utility vehicle provided with an electric power steering system according to the present invention.

FIG. 1 is a left side view showing the four wheeled utility vehicle, which is provided with a pair of right and left front wheels 1 in the front portion of the vehicle, a pair of right and left rear wheels 2 in the rear portion of the vehicle, a cabin 5 defined between the front wheels 1 and the rear wheels 2 and constituted of a metallic cabin frame 4, a carrier 6 disposed behind the cabin 5, a bonnet 8 disposed in front of the cabin 5, a pair of right and left front fenders 9 disposed in front of the cabin 5, and a bumper 10 in front of the bonnet 8. The upper portion of the cabin 5 is covered with a protecting frame 3 made of a metallic pipe.

A bench-type front seat 12 and a bench-type rear seat 13 are housed in the cabin 5. A steering column 21 of the vehicle having an electric power steering system 15 (see FIG. 3) projects upward to the back from a dashboard 7 disposed at the front portion of the cabin 5. A steering wheel 22 is disposed at a top of the steering column 21 to be turnably operated by an operator of the vehicle. An engine 14 is mounted at the rear portion of the rear seat 13 and under the carrier 6.

Figure 2:
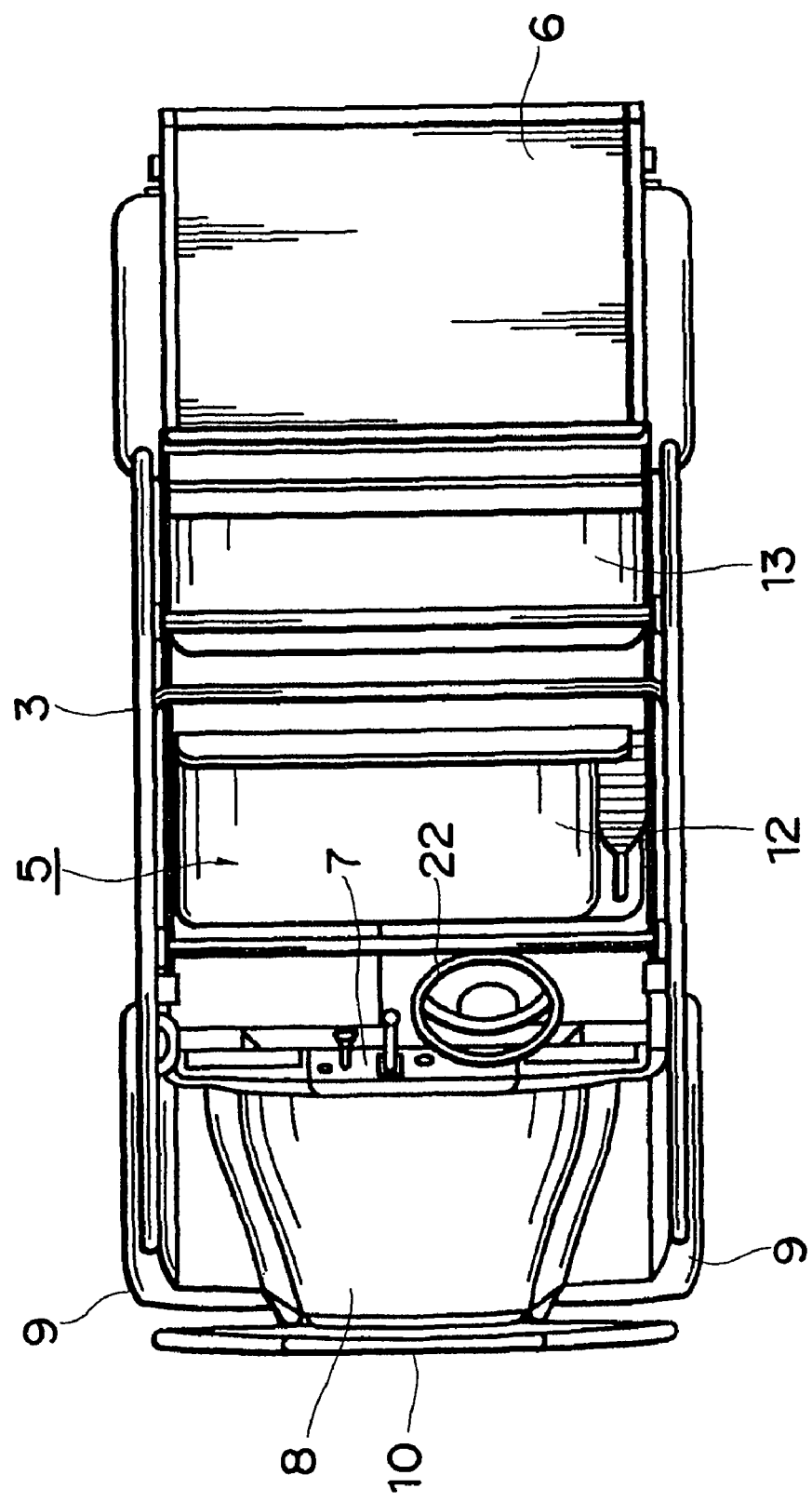
FIG. 2 is a plan view showing the four wheeled utility vehicle of FIG. 1.

FIG. 2 is a plan view showing the four wheeled utility vehicle, in which the steering wheel 22 is disposed in front of a driver's seat on the left of the front seat 12.

(Configuration of Frame Assembly of Front Portion of Vehicle)

Figure 3:
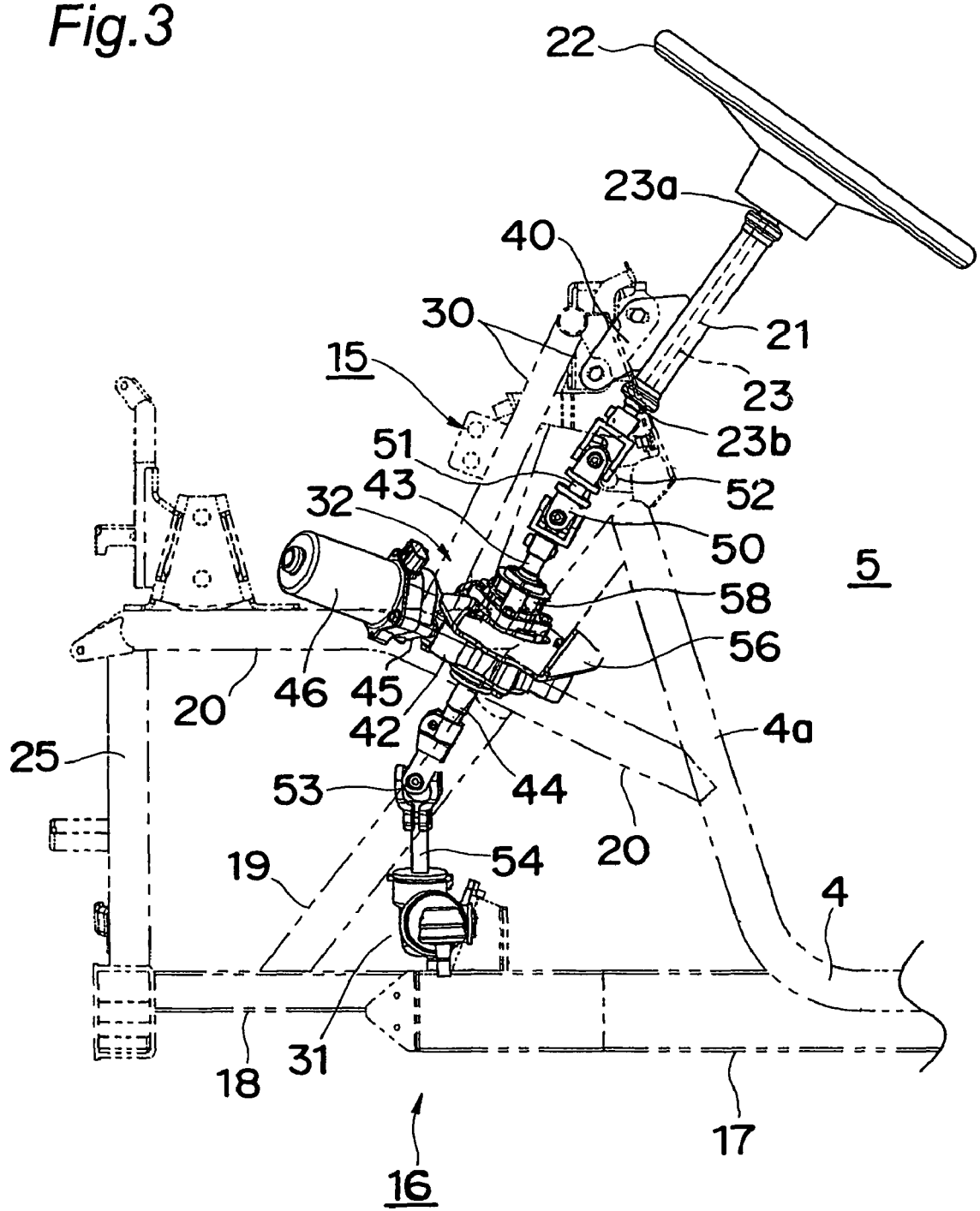
FIG. 3 is a left side view showing an electric power steering system for the vehicle of FIG. 1.
Figure 4:
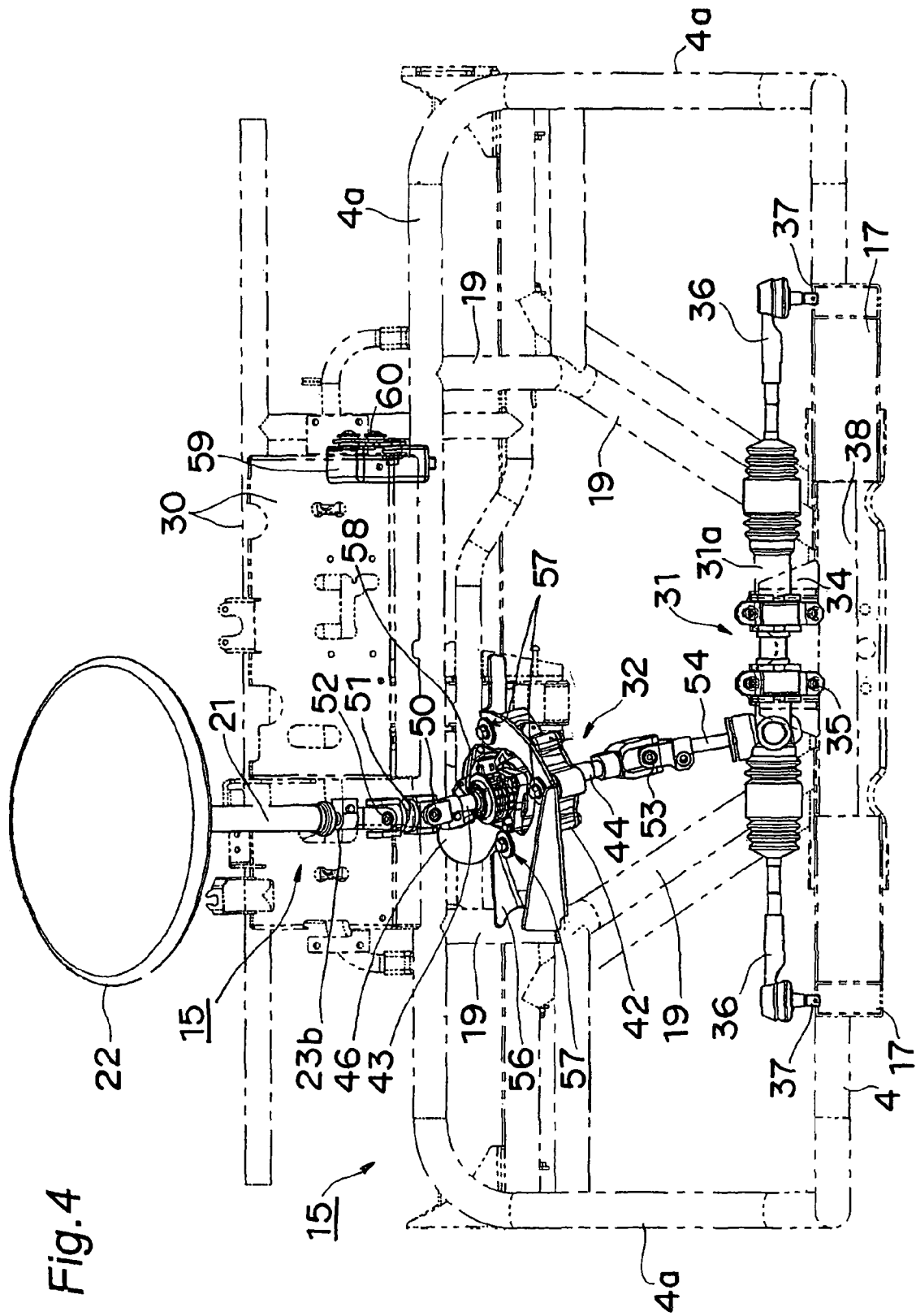
FIG. 4 is a back view showing the electric power steering system of FIG. 3.
Figure 5:
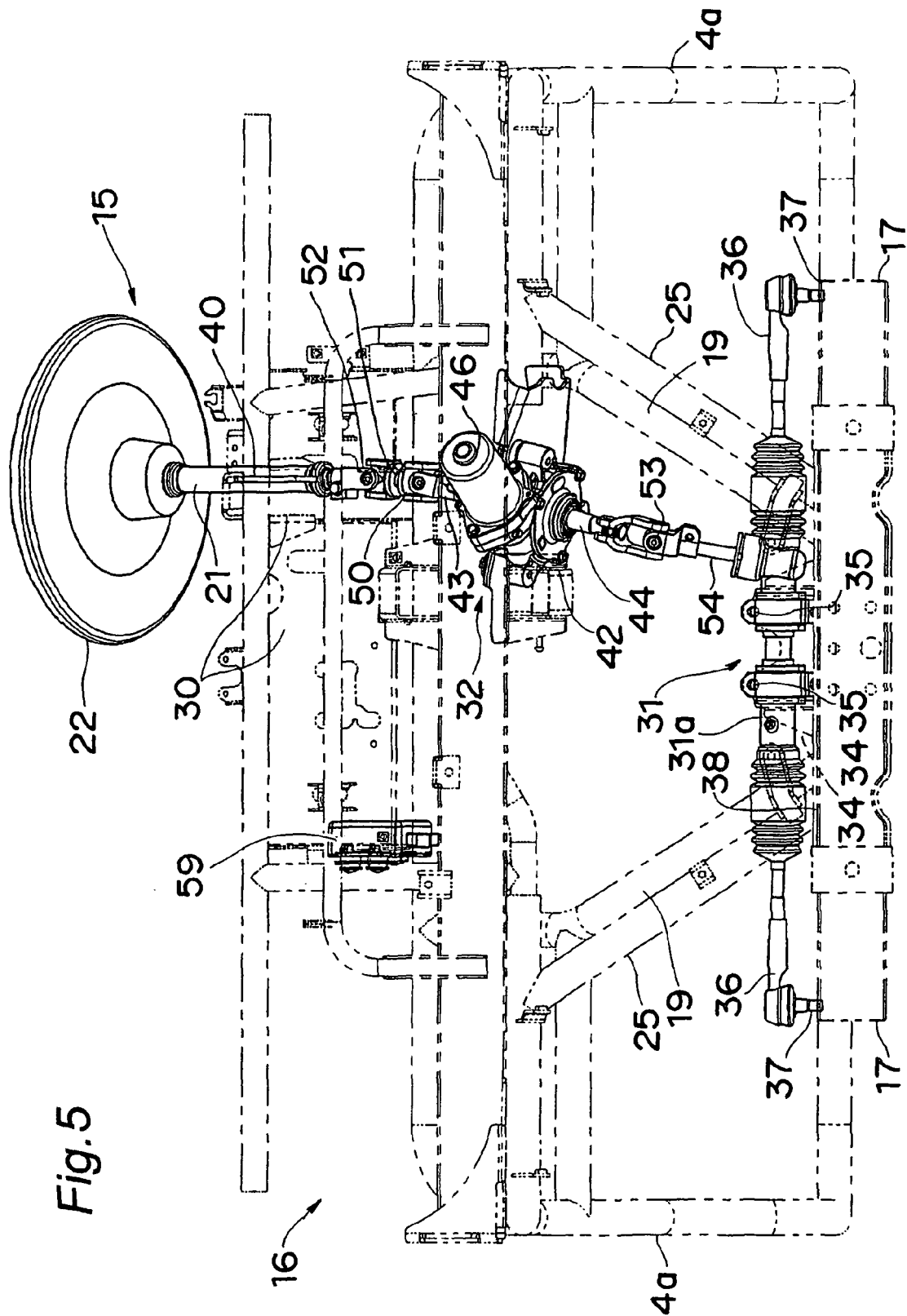
FIG. 5 is a front view showing the electric power steering system of FIG. 3.

FIG. 3 is a left side view showing the front portion of the vehicle, at which the electric power steering system 15 according to the present invention is arranged. In this figure, a solid line indicates the steering system 15 and a chain double-dashed line indicates a frame structure of the vehicle. FIG. 4 is a back view of FIG. 3, and further, FIG. 5 is a front view of FIG. 3. In FIG. 3, a front frame assembly 16 constituted by a plurality of frame members is disposed in front of the cabin 5. The front frame assembly 16 includes a pair of right and left main frame members 17 disposed along a floor of the cabin 5 and extends forward from the cabin 5, a pair of extending frame members 18 extending forward from the front ends of the main frame members 17, a rising portion 4a of the cabin frame 4 formed at a front end thereof, a pair of right and left reinforcing frame members 19 which extend downward to the front from an upper end of the rising portion 4a and are connected to the extending frame members 18, respectively, an upper frame member 20 extending upward to the front from the middle of the rising portion 4a, a front end frame member 25 for connecting a front end of the upper frame member 20 and a front end of the extending frame member 18 to each other, and other necessary frame members. Moreover, frame members 30 for a dashboard are disposed in the vicinity of the respective upper ends of the rising portion 4a and the reinforcing frame members 19.

(Configuration of Electric Power Steering System)

In FIG. 3, the electric power steering system 15 includes the above-described steering column 21, the steering wheel 22 securely fixed at a top 23a of a steering shaft 23 incorporated rotatably in the steering column 21, a rack and pinion steering gear device 31 to change a rotational force (steering torque) of the steering wheel to a lateral force to steer the front wheels laterally, the rack and pinion steering gear device 31 being disposed in the vicinity of the front end of the main frame 17, an electric power assist device 32, and other necessary members.

In FIG. 5, an outer case 31a of the rack and pinion steering gear device 31 is fixed to a fixing bracket 34 via bolts 35 or the like, and further, the fixing bracket 34 is securely welded to a cross member 38 for connecting the right and left main frame members 17 to each other. The rack of the rack and pinion steering gear device 31 integrally includes right and left rack extensions 36, each having a pin 37 at the tip thereof. Each pin 37 is pivotally connected to a knuckle arm (not shown) disposed in the front wheel 1 (see FIG. 1). Specifically, the rack extension 36 has the function of a tie rod, so that both of the front wheels 1 are laterally steered in association with the lateral motion of the rack and the rack extensions 36.

In FIG. 3, a fixing bracket 40 is formed integrally with the steering column 21 at an upper front surface of the steering column 21, and further, is fixed to the frame members 30 for a dashboard via bolts or the like.

The electric power assist device 32 includes an assist case 42, an input shaft 43 projecting upward from the assist case 42, an output shaft 44 projecting downward from the assist case 42, an electric motor 46 fixed to a motor fixing portion 45 formed on assist case 42, and a well-known structured power assist element incorporated in the assist case 42. The power assist element adds an assist torque of the electric motor 46 to a steering torque of the input shaft 43 transmitted from the steering wheel 22, thereby the increased steering torque is transmitted to the output shaft 44.

In the present preferred embodiment, an upper end of the input shaft 43 of the electric power assist device 32 is connected to a lower end of an intermediate coupling shaft 51 via a universal joint 50, and further, an upper end of the intermediate coupling shaft 51 is connected to a lower end 23b of the steering shaft 23 via another universal joint 52. In other words, the input shaft 43 of the electric power assist device 32 is connected to the steering shaft 23 via the two universal joints 50 and 52. In the meantime, the output shaft 44 disposed at a lower portion of the electric power assist device 32 is connected to an input shaft 54 of the rack and pinion steering gear device 31 via a further universal joint 53.

In FIG. 4, the assist case 42 of the electric power assist device 32 is fixed to a lower surface of a flat fixing bracket 56 via elastic tighteners 57. The fixing bracket 56 is securely welded to the reinforcing flame member 19.

Moreover, a torque sensor 58 for measuring the steering torque of the input shaft 43 is disposed in the electric power assist device 32 such that a signal indicating the measured steering torque is input into a control unit 59. The control unit 59 is arranged at a position near the right inside of the dashboard, and is fixed to the frame member 30 for the dashboard via a fixing bracket 60 or the like. The torque sensor 58 and the electric motor 46 are electrically connected to the control unit 59.

Figure 6:
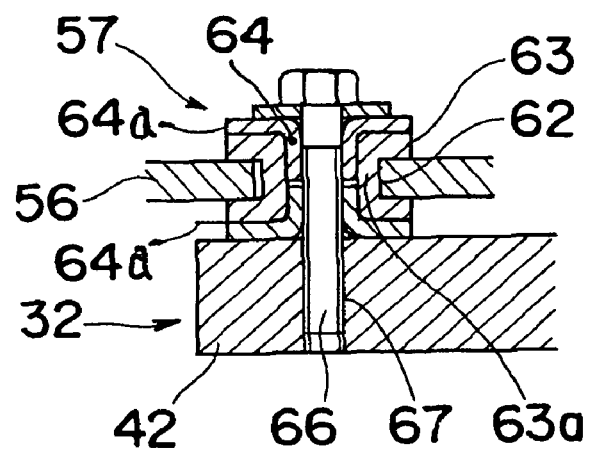
FIG. 6 is a vertically cross-sectional view showing a fixing portion of an electric power assist device in the electric power steering system of FIG. 3 in enlargement.
Figure 7:
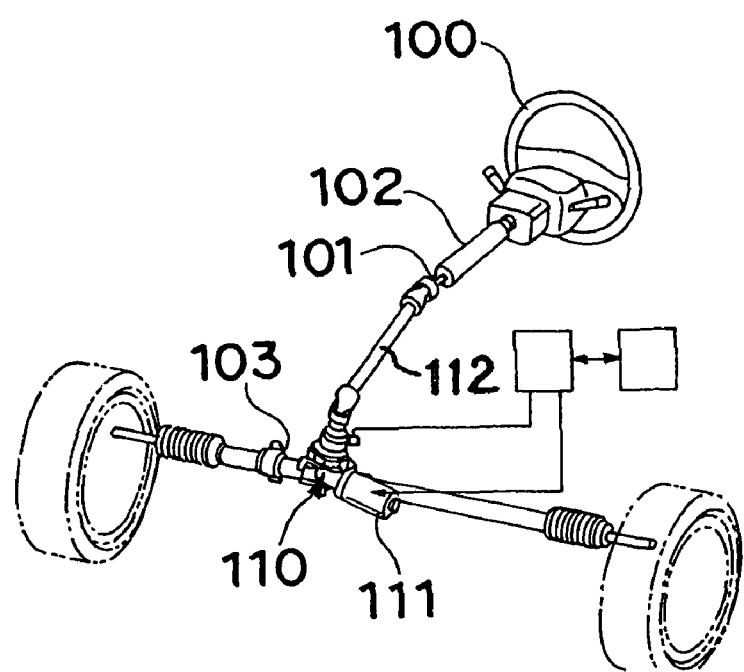
FIG. 7 is a perspective view showing a conventional art.

FIG. 6 shows a particular construction of the elastic tightener 57 of the electric power assist device 32. A fixing hole 62 is formed in the fixing bracket 56 for the electric power assist device 32; a cylindrical dumper 63 made of rubber is inserted into the fixing hole 62; and an annular groove 63a formed at the outer peripheral surface of the cylindrical dumper 63 is engaged with an inner circumferential edge of the fixing hole 62. A collar 64 provided with a pair of upper and lower flanges 64a is fitted inside of the cylindrical dumper 63, and further, the flanges 64a of the collar 64 are brought into contact with the upper and lower end surfaces of the cylindrical dumper 63, respectively. A fixing bolt 66 is inserted into the collar 64 from above. The assist case 42 is elastically tightened to the fixing bracket 56 by screwing the fixing bolt 66 to a female hole 67 formed at the assist case 42 disposed under the fixing bracket 56.

(Operation)

A basic operation of the electric power steering system 15 is identical to that of the conventional system, and therefore, will be simply explained below. In FIG. 3, when an operator turns the steering wheel 22, the steering torque of the steering wheel 22 is transmitted to the steering shaft 23 housed in the steering column 21, and further, is transmitted to the input shaft 43 of the electric power assist device 32 via the upper universal joint 52, the intermediate coupling shaft 51 and the intermediate universal joint 50.

The steering torque of the input shaft 43 is measured by the torque sensor 58, and then, the measurement value is input into the control unit 59 shown in FIG. 5. The control unit 59 calculates the assist torque of the electric motor corresponding to the measured torque, sends a signal indicating the assist torque to the electric motor 46, and then, drives the electric motor 46 on the basis of the assist torque. As a consequence, the steering torque of the input shaft 43 is increased, and thereafter, the increased steering torque is transmitted to the output shaft 44.

In the present preferred embodiment, since the two universal joints 52 and 50 (i.e., at the two positions) are interposed on a steering torque train between the steering wheel 22 and the input shaft 43 of the electric power assist device 32, neither a large bending effect nor a distortion occur on the input shaft 43 even if misalignment due to a fixing error occurs between the input shaft 43 of the electric power assist device 32 and the steering shaft 23 or the steering column 21 is vibrated, and thus, the steering torque can be efficiently transmitted to the input shaft 43 of the electric power assist device 32. Additionally, the steering torque can be efficiently transmitted to the input shaft 43 of the electric power assist device 32, so that the steering torque can be accurately measured by the torque sensor 58 in the electric power assist device 32.

Moreover, since the electric power assist device 32 is supported on the fixing bracket 56 by the elastic tightener 57, the steering torque can be more efficiently transmitted to the input shaft 43, and further, the steering torque can be accurately measured by the torque sensor 58 in cooperation with the effects of the two universal joints 52 and 50 even if the misalignment occurs between the input shaft 43 of the electric power assist device 32 and the steering shaft 23 or the steering column 21 is vibrated, as described above.

The steering torque transmitted to the output shaft 44 of the electric power assist device 32 is transmitted to the input shaft 54 of the rack and pinion steering gear device 31 via the lower universal joint 53, and then, the rotation of the input shaft 54 is converted into the lateral motion of the rack, to be transmitted to the front wheels 1 via the right and left rack extensions 36.

In the present preferred embodiment, since the electric power assist device 32 is displaced as a part of the steering torque train between the steering shaft 23 of the steering column 21 and the input shaft 54 of the rack and pinion steering gear device 32, it is possible to effectively utilize a space between the steering column 21 and the rack and pinion steering gear device 32, thus making the entire vehicle compact.

In addition, although a steering torque transmitting shaft is commonly interposed between the steering column and the steering gear device in the conventional vehicle having no power assist device, the steering torque transmitting shaft can be replaced with the electric power assist device in the present preferred embodiment. Thus, the steering system in the conventional vehicle can be readily improved to the power steering system according to the present invention.

Other Preferred Embodiments

The electric power steering system according to the present invention may be applied to a steering system having a ball screw steering gear device, a worm pin steering gear device or the like in place of the rack and pinion steering gear device.

In the preferred embodiment shown in FIGS. 3 to 5, although the two universal joints 50 and 52 are disposed between the input shaft 43 of the electric power assist device 32 and the steering shaft 23, a single universal joint may be disposed therebetween.

It is to be understood that the invention should not be limited to the structure in the above-described preferred embodiments, and therefore, that various modifications can be applied within the scope of claims.

What is claimed is:

1. An electric power steering system for a vehicle comprising:

a steering wheel configured to be turnably operated by an operator;

a steering shaft having a lower end and being connected to the steering wheel;

a steering column for incorporating rotatably therein the steering shaft, the steering column extending downward to the front of the vehicle;

an electric power assist device for assisting a steering torque of the steering wheel and having a top end and a lower end; and a steering gear device for changing the steering torque to a lateral force to steer front wheels of the vehicle and having a top;

wherein a first input shaft provided at the top end of the electric power assist device is connected to the lower end of the steering shaft via first and second universal joints;

an output shaft provided at the lower end of the electric power assist device is connected to a second input shaft provided at the top of the steering gear device via a third universal joint; and the first and second universal joints are disposed between the steering shaft and the electric power assist device, the first and second universal joints abutting each other, and being directly-connected to each other.

2. The electric power steering system for the vehicle according to claim 1, wherein the electric power assist device includes an input portion, and a torque sensor for measuring the steering torque of the steering wheel is disposed at the input portion of the electric power assist device.

3. The electric power steering system for the vehicle according to claim 1, wherein the electric power assist device is fixed to a fixing bracket disposed in a vehicle frame via an elastic tightening device.

4. The electric power steering system for the vehicle according to claim 1, wherein the steering gear device is a rack and pinion steering gear device.

5. A four wheeled utility vehicle provided with an electric power steering system for a vehicle comprising:

a steering wheel configured to be turnably operated by an operator;

a steering shaft having a lower end and being connected to the steering wheel;

a steering column for incorporating rotatably therein the steering shaft, the steering column extending downward to the front of the vehicle;

an electric power assist device for assisting a steering torque of the steering wheel and having a top end and a lower end; and a steering gear device for changing the steering torque to a lateral force to steer front wheels of the vehicle and having a top;

wherein a first input shaft provided at the top end of the electric power assist device is connected to the lower end of the steering shaft via first and second universal joints;

an output shaft provided at the lower end of the electric power assist device is connected to a second input shaft provided at the top of the steering gear device via a third universal joint; and the first and second universal joints are disposed between the steering shaft and the electric power assist device, the first and second universal joints abutting each other, and being directly-connected to each other.

* * * * *